United States Patent
Baun et al.

(10) Patent No.: US 10,711,764 B2
(45) Date of Patent: Jul. 14, 2020

(54) CONTROL SYSTEM FOR WIND TURBINE HAVING MULTIPLE ROTORS ARRANGED TO CONTROL SUPPORT ARM ORIENTATION

(71) Applicant: VESTAS WIND SYSTEMS A/S, Aarhus N (DK)

(72) Inventors: Torben Ladegaard Baun, Skødstrup (DK); Erik Carl Lehnskov Miranda, Randers SV (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 404 days.

(21) Appl. No.: 15/550,330

(22) PCT Filed: Feb. 12, 2016

(86) PCT No.: PCT/DK2016/050042
§ 371 (c)(1),
(2) Date: Aug. 10, 2017

(87) PCT Pub. No.: WO2016/128005
PCT Pub. Date: Aug. 18, 2016

(65) Prior Publication Data
US 2018/0180022 A1    Jun. 28, 2018

(30) Foreign Application Priority Data
Feb. 12, 2015   (DK) .................................. 2015 70082

(51) Int. Cl.
*F03D 7/02*   (2006.01)
(52) U.S. Cl.
CPC .......... *F03D 7/0208* (2013.01); *F03D 7/0224* (2013.01); *F03D 7/0264* (2013.01);
(Continued)

(58) Field of Classification Search
CPC .......... F03D 1/02; F03D 7/028; F03D 7/0224; F03D 7/0264; F03D 7/0268;
(Continued)

(56) References Cited

U.S. PATENT DOCUMENTS

| 7,175,389 B2 | 2/2007 | Moroz |
| 2006/0002791 A1 | 1/2006 | Moroz |

(Continued)

FOREIGN PATENT DOCUMENTS

| CN | 1633559 A | 6/2005 |
| CN | 1702321 A | 11/2005 |

(Continued)

OTHER PUBLICATIONS

Chinese Office Action for Application No. 201680015242.5 dated May 5, 2019.
(Continued)

*Primary Examiner* — Brian P Wolcott
(74) *Attorney, Agent, or Firm* — Patterson + Sheridan, LLP

(57) ABSTRACT

The invention is directed to a wind turbine system comprising a first pair of wind turbines mounted to a support structure by a first support arm arrangement, and a second pair of wind turbines mounted to the support structure by a second support arm arrangement. The first and second support arm arrangements are mounted to the support structure at a respective yaw unit so as to yaw about the major axis of the support structure. Moreover, the wind turbine system further includes a control system that is configured to control the yaw angle of each of the first and second support arm arrangements, wherein the control system is configured to identify the presence of a predetermined shutdown condition and, in response, the control system is operable to control the yaw angles of the first support arm arrangement (Continued)

and the second support arm arrangement to a predetermined safe state.

14 Claims, 8 Drawing Sheets

(52) U.S. Cl.
CPC ........ *F03D 7/0268* (2013.01); *F05B 2260/70* (2013.01); *F05B 2270/328* (2013.01); *F05B 2270/329* (2013.01); *Y02E 10/723* (2013.01)

(58) Field of Classification Search
CPC .......... F05B 2270/328; F05B 2270/329; F05B 2260/70; Y02E 10/723
See application file for complete search history.

(56) References Cited

U.S. PATENT DOCUMENTS

| | | |
|---|---|---|
| 2009/0008939 A1 | 1/2009 | Pare et al. |
| 2009/0081041 A1* | 3/2009 | Frese ................ F03D 7/0212 416/1 |
| 2011/0037271 A1 | 2/2011 | Sheinman |
| 2012/0027566 A1 | 2/2012 | Boerlage et al. |
| 2013/0033040 A1 | 2/2013 | Bowyer et al. |
| 2013/0300123 A1 | 11/2013 | Li et al. |

FOREIGN PATENT DOCUMENTS

| | | | |
|---|---|---|---|
| CN | 102084127 A * | 6/2011 | ........... F03D 7/0268 |
| CN | 102084127 A | 6/2011 | |
| CN | 102305188 A | 1/2012 | |
| CN | 102322400 A | 1/2012 | |
| CN | 107327248 A | 11/2017 | |
| DE | 3113247 A1 | 10/1982 | |
| DE | 4236092 A1 | 4/1994 | |
| DE | 202009009654 U1 | 9/2009 | |
| GB | 2443886 A | 5/2008 | |
| WO | 2011131792 A2 | 10/2011 | |
| WO | WO-2011131792 A2 * | 10/2011 | ........... F03B 17/061 |

OTHER PUBLICATIONS

International Search Report for PCT/DK2016/050042, dated May 18, 2016.
Danish Search Report for PA 2015 70082, dated Aug. 28, 2015.
Chinese Office Action for Application No. 201680015242.5 dated Sep. 29, 2018.

* cited by examiner

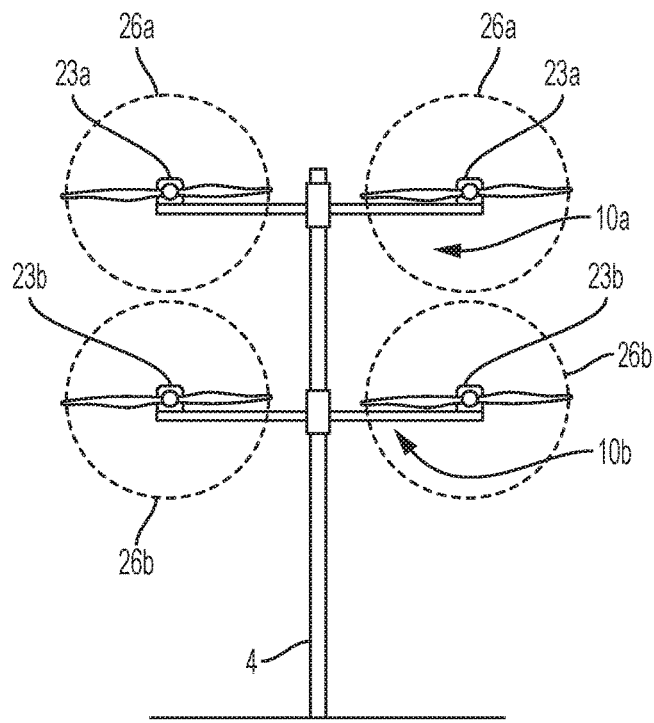
FIG. 9
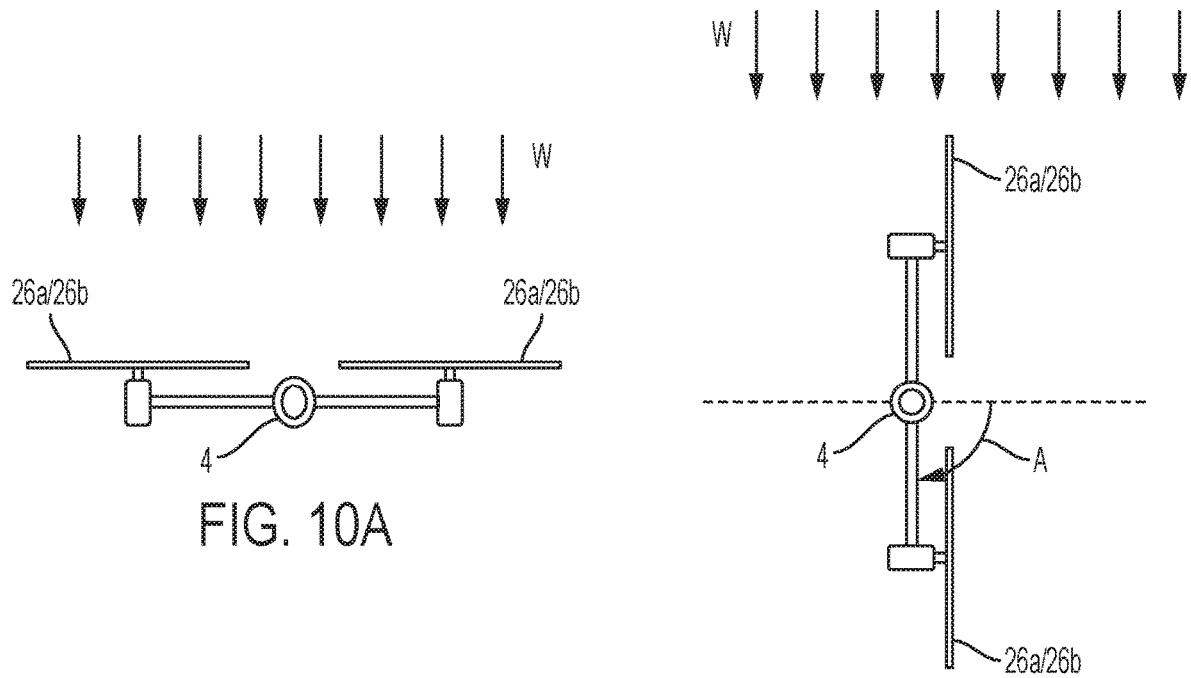
FIG. 10A
FIG. 10B

CONTROL SYSTEM FOR WIND TURBINE HAVING MULTIPLE ROTORS ARRANGED TO CONTROL SUPPORT ARM ORIENTATION

TECHNICAL FIELD

The invention relates to a control system of a wind turbine system having multiple rotors carried by support arm arrangements and more particularly, but not exclusively, to controlling the yaw angle of each support arm arrangement in a shutdown condition.

BACKGROUND TO THE INVENTION

The most common type of wind turbine is the three-bladed upwind horizontal-axis wind turbine (HAWT), in which the turbine rotor is at the front of the nacelle and facing the wind upstream of its supporting tower. However, several alternative wind turbine designs are also known. One example is the multi-rotor array type wind turbine.

EP1483501B1 discloses a multi-rotor array-type wind turbine in which a plurality of co-planar rotors are mounted to a common support structure. Such a configuration achieves similar economies of scale that can be obtained with a very large single rotor turbine, but avoids the associated drawbacks such as high blade mass, scaled up power electronic components and so on. However, although such a co-planar multi-rotor wind turbine has its advantages, it presents challenges to implement the concept in practice, particularly in how manage plurality of rotors, or nacelles, during high wind speeds.

SUMMARY OF THE INVENTION

It is against this background that the invention provides a wind turbine system comprising a first pair of wind turbines mounted to a support structure by a first support arm arrangement, and a second pair of wind turbines mounted to the support structure by a second support arm arrangement, wherein the first and second support arm arrangements are mounted to the support structure at a respective yaw unit so as to yaw about the major axis of the support structure. A control system is configured to control the yaw angle of each of the first and second support arm arrangements, wherein the control system is configured to identify the presence of a predetermined shutdown condition and, in response, the control system is operable to control the yaw angles of the first support arm arrangement and the second support arm arrangement to a predetermined safe state.

The control system may be configured to control a respect yaw unit of each of the support arm arrangements in order that they may be driven to yaw about the support structure into a desired position. Alternatively, or in addition, the control system may be configured to control the pitch of the blades of the wind turbines in order to achieve a differential thrust between the wind turbines of each pair mounted on a respective one of the support arm arrangements. So, differential thrust between the wind turbines, may be used on its own to control the yaw angle of the support arm arrangements, or may be used to support the operation of the yaw units, meaning that smaller, less power consuming yaw units can be used.

In general, the control system is configured to control the orientation of the support arms with respect to the wind direction and with respect to the angular orientation of the individual arms with respect to each other.

A benefit of the invention is that the support arm arrangements are configured into a safe position so that wind conditions impose less structural stress on the support structure. So, in the event of detecting a shutdown condition, the control system can configure the support arm arrangements so that the support structure is protected from high stresses when it is idle. The shutdown condition may be detected in connection with a transition from a production state to a non-producing state, e.g. standstill or idle state. However, the shutdown condition may also be detected as a stationary state, e.g. as a non-producing state, to be maintained until a non-shutdown condition is detected.

In one embodiment, in the safe state the yaw angle of the first support arm arrangement may be controlled so as to be substantially parallel to the wind direction.

In other embodiments, the control system is operable to configure the yaw angles of the first support arm arrangement and the second support arm arrangement to a predetermined safe position in which the yaw angle of the first support arm arrangement is different to the yaw angle of the second support arm arrangement. This is particularly suitable to system in which each turbine has three or more blades. The position of the support arm arrangements is such that the wind turbines point in different directions, which reduces the stress generated in the support structure.

Other preferred and/or optional features are set out in the appended claims.

BRIEF DESCRIPTION OF THE DRAWINGS

So that it may be more fully understood, the invention will now be described by way of example only with reference to the following drawings, in which:

FIG. 9 is a front view of a further embodiment of a wind turbine system, wherein FIG. 10a is a top view of the wind turbine system of FIG. 9 in an operating state, and wherein FIG. 10b is a top view, comparable to that of FIG. 10a, but which shows the wind turbine system in a safe state.

DETAILED DESCRIPTION OF EMBODIMENTS OF THE INVENTION

Figure 1:
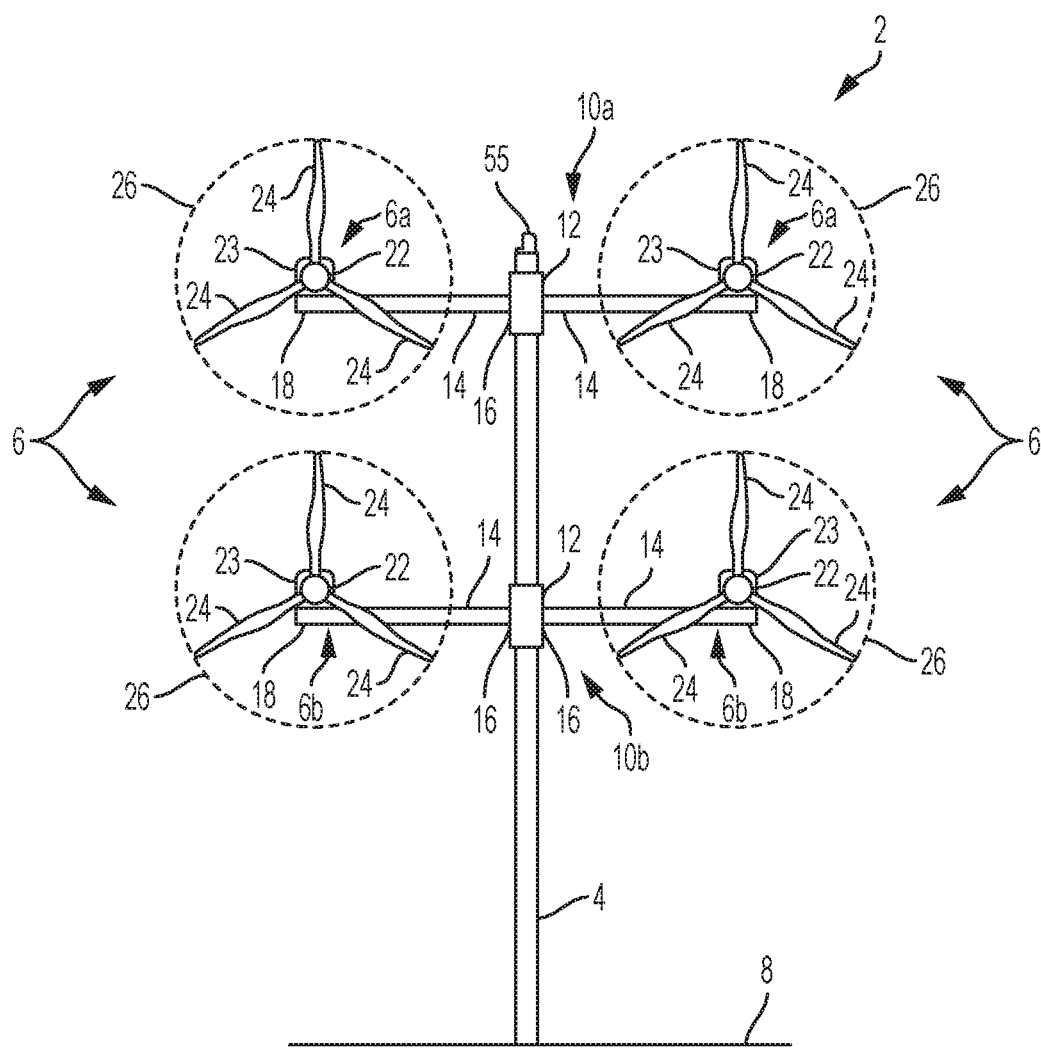
FIG. 1 is a front view of a first embodiment of a multi-rotor wind turbine system.
Figure 2:
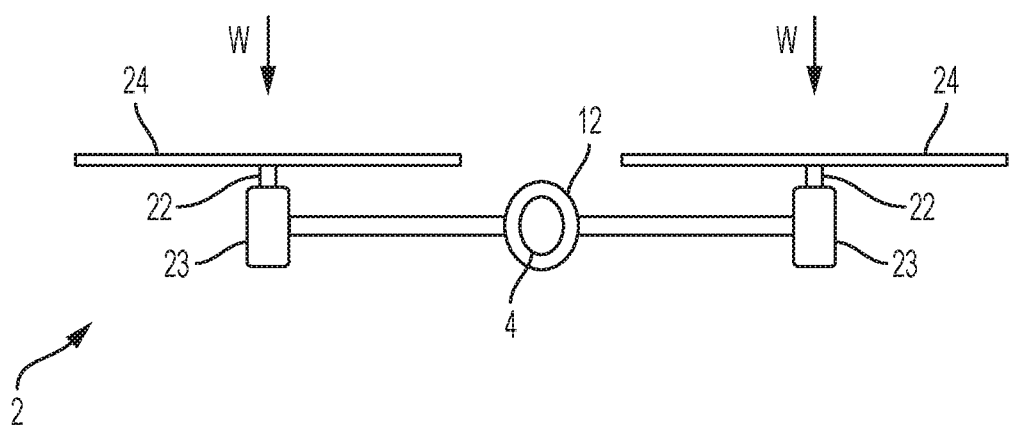
FIG. 2 is a top view of the wind turbine system in FIG. 1.

With reference to FIGS. 1 and 2, a wind turbine installation or 'system' 2 includes a support structure in the form of a tower 4 on which is mounted a plurality of wind turbines 6. The entire wind turbine system 2 is supported on a foundation 8, as is usual. Note that the term 'wind turbine' is used here in the industry-accepted sense to refer mainly to the generating components of the wind turbine system and as being separate to the tower 4. The wind turbines may also be referred to as wind turbine modules. Note also that the foundation 8 may be a large mass e.g. concrete or steel embedded in the ground, or may be in the form of a monopole or jacket structure in an offshore wind farm installation.

In this embodiment, there are four wind turbines 6, and these are mounted to the tower 4 in two pairs, each pair including two wind turbines 6 that are mounted to the tower 4 by a respective support arm arrangement 10. So, a first pair of the wind turbines, labelled as 6a, is associated with a first support arm arrangement 10a, and a second pair of the wind turbines, labelled as 6b, are associated with a second support arm arrangement 10b.

Since each pair of wind turbines and their associated support arm arrangement are essentially identical, they will be referred to below generally by reference numerals without suffixes. This also applies to components of the support arm arrangements. However, reference to a specific one of the support arm arrangement, associated wind turbines, or sub-components, will be made using the suffixes 'a' or 'b' to refer to the upper or lower support arm arrangement, as appropriate. In general, however, the pairs need not be identical, but can be configured in relation to the different hub heights.

Each support arm arrangement 10 comprises a mount portion 12 and first and second support arms 14 that extend from the mount portion 12 and which carry a respective wind turbine 6. As such, each of the support arms 14 includes an inner end 16 connected to the mount portion 12 and an outer end 18 that is connected to a wind turbine 6.

The support arm arrangement 10 is mounted to the tower 4 at the mount portion 12 so that the support arm arrangement 10 is able to yaw about the vertical axis of the tower 4. A suitable yaw system (not shown) is provided for this purpose, and such yaw systems are known generally in the art. The mount portion 12 therefore represents a yaw unit of the support arm arrangement 10 which is able to 'yaw', i.e. move angularly, the support arm arrangement 10 about the major axis of the tower 4. Note that in FIG. 2, only the upper one of the support arm arrangements can be seen, since the lower one is hidden. Further note that the yaw units will be referred to using the same reference numerals as for the mount portions 12.

Each wind turbine 6 includes a rotor 22 that is rotatably mounted to a nacelle 23 in the usual way. The rotor 22 has a set of three blades 24 in this embodiment. Three-bladed rotors are a common rotor configuration, but different numbers of blades are also known. Thus, the wind turbines 6 are able to generate power from the flow of wind that passes through the swept area or 'rotor disc' 26.

During operation, the forces generated by the wind turbines 6 excite the tower 4 and cause it to oscillate in different modes; for example the tower 4 will sway back and forth, and also side to side, thereby giving rise to first and second modes of oscillation. The tower 4 may also experience torsional excitation, due to wind action but also due to any thrust imbalances between individual ones of the wind turbines 6, which gives rise to another mode of oscillation. The oscillation of the support structure leads to fatigue which may impact the service life of the installation as a whole. Although the tower and support arm arrangements are designed to withstand a certain amount of structural stress, high wind speeds can cause excessive stress to be placed on the structure during operation. A related problem is that even moderate wind conditions will cause the structure to oscillate when the wind turbine system has been brought to, or is in, an idle or stop state, for example during a shutdown event. The present invention provides a strategy for managing the stress induced on the wind turbine during such shutdown states.

FIGS. 1 and 2 show the main structural components of the wind turbine system 2, although the skilled person would understand that the illustrated embodiment has been simplified in order not to obscure the invention with unnecessary detail. Further explanation will now be provided on the system components of the wind turbine system 2 with reference also to FIG. 3.

On a systems level, each wind turbine 6 includes a gearbox 30 and a power generation system 31 including a generator 32 and a converter system 34. As is known, the gearbox 30 gears up the rotational speed of the rotor and drives the generator 32 which, in turn, feeds generated power to a converter system 34. Such an architecture is known, and others are possible, such as 'gearless' types, also known as 'direct drive', as well as 'belt drive' transmission types.

A pitch control system 36 is also provided to control the pitch of the blades relative to the longitudinal axis of the blades. The precise configuration of the generator 32 and converter system 34 are not central to the invention and will not be described in detail. However, for present purposes they can be considered to be conventional and, in one embodiment, may be based on a full scale converter (FSC) architecture or a doubly fed induction generator (DFIG) architecture, although other architectures would be known to the skilled person. Furthermore, each of the wind turbines can be considered to be substantially identical, so only one has been labelled fully in FIG. 3 for clarity.

In the illustrated embodiment, the power output of the converter 34 of each wind turbine 6 is fed to a distribution unit 40 which has a function to receive power inputs 42 from the wind turbines 6 over suitable cabling 44 for onward transmission to a load 46, which is shown here as the electrical grid. Although not shown here, it should be appreciated that the central control and distribution unit 40 may be located in any suitable position, for example within the tower 4. The skilled person would be aware that different power conversion and transmission options exist, and it would be within the abilities of the skilled person to specify a suitable system. Thus, this aspect is not described in more detail here.

It should be noted at this point that only a single wind turbine system 2 is described here, but that several such systems may be grouped together to form a wind power plant, also referred to as a wind farm or 'park'. In this case, a power plant control and distribution facility (not shown) would be provided to coordinate and distribute the power outputs from the individual wind turbine systems to the wider grid.

Since the wind turbine system 2 includes a plurality of wind turbines 6, each of which is operable to generate electrical power as the rotor 22 is driven by the wind, the wind turbine system 2 includes localised control means 49 that is operable to monitor the operation of respective ones of the plurality of wind turbines 6 and to issue commands thereto to achieve a set of local control objectives. In this embodiment, the localised control means 49 is provided in the form of a plurality of local control modules 50 that are embodied as respective computing devices each of which is dedicated to an associated wind turbine 6. One such control objective is to monitor rotor speed and power output and to control the pitch control system 36 and the generator 32 in order to ensure that maximum power is extracted from the wind during below-rated and that the rotational speed is controlled above-rated operating conditions.

Although each of the wind turbines 6 includes a local control module 50, the wind turbine system 2 also includes a centralised control means 51 which serves a supervisory function in order to provide a coordinated control strategy. In this embodiment, the centralised control means 51 is provided by a central control module 52 being a computing device incorporated in the central distribution unit 40 but, in general, it may also be placed separate from the distribution unit. Here, the central control module 52 is located on the tower 4, e.g. in the tower or in a housing adjacent the tower, although it is envisaged that other locations would be acceptable. As will be explained, the central control module 52 is configured to monitor the operation of the wind power system 2, that is to say the wind turbines 6 and the tower 4, and to provide centralised control commands to the plurality of wind turbines 6 in order to achieve a supervisory control objective.

Figure 3:
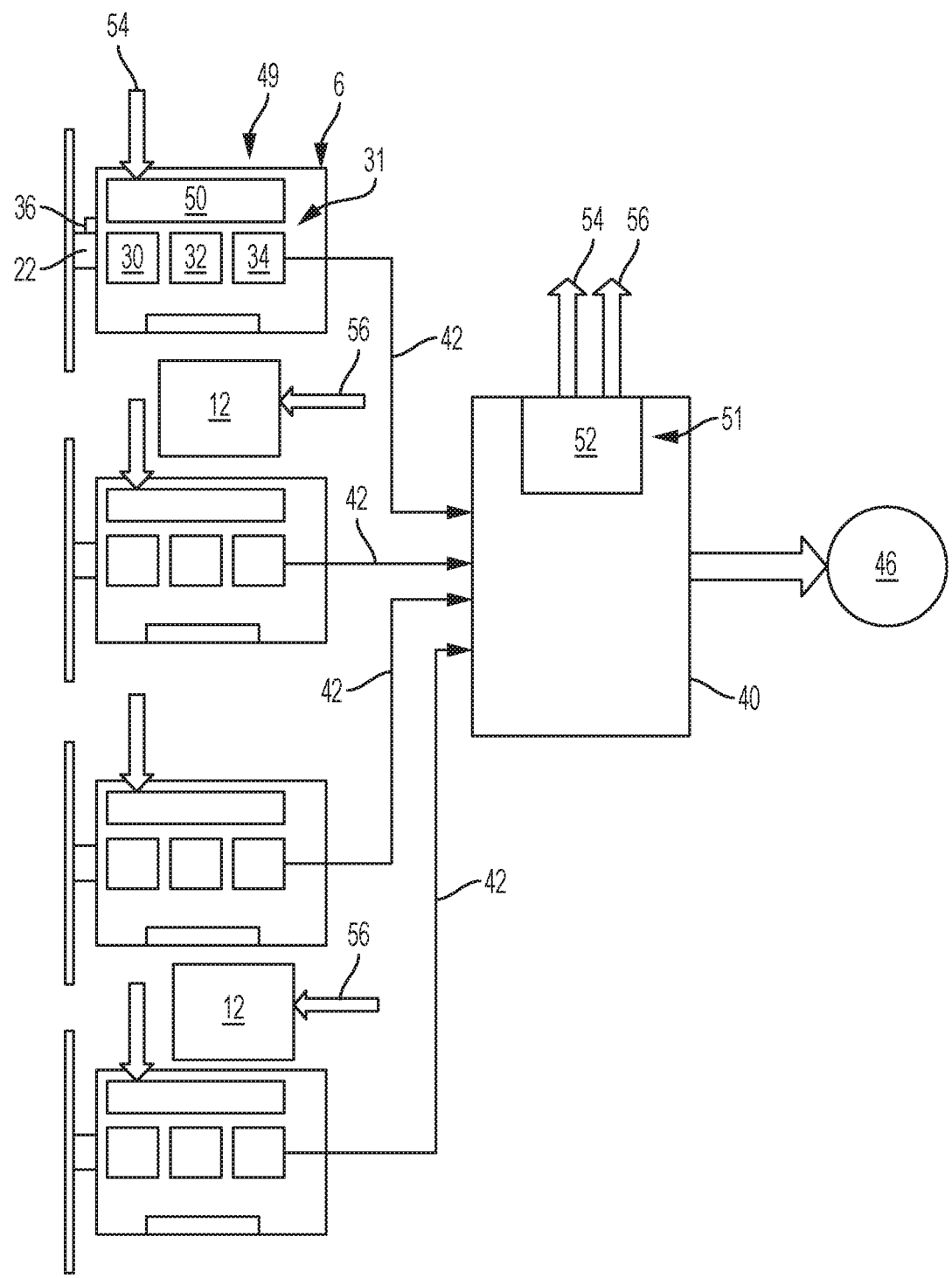
FIG. 3 is a schematic systems view of the wind turbine system in FIG. 1.

The central control module 52 achieves control over each of the wind turbines 6 by providing control commands to them. As shown in FIG. 3, the central control module 52 outputs first control commands 54 which are received by each one of the wind turbines 6 and, more particularly, are received by the local control modules 50. The control commands 54 may be of the 'broadcast' type of command in which the same command is sent out to each wind turbine 6, or the commands may be of the 'directed' type of command in which a specific control command is set to a selected one or more, but not all, of the wind turbines 6.

The central control module 52 is also configured to provide a second control command, shown here as '56', to the first yaw unit 12*a* and the second yaw unit 12*b* in order to control the yaw angle of the respective support arm arrangements 10*a*, 10*b* about the tower 4.

It will be noted that FIG. 3 is a schematic view, so the way in which the control commands 54, 56 are transferred to the wind turbines 6 is not depicted explicitly. However, it will be appreciated that suitable cabling may be provided to interconnect the central control unit 52 to the wind turbines 6, and more specifically to the local control modules 50. The interconnections may be direct or 'point to point' connections, or may be part of a localised area network (LAN) operated under a suitable protocol (CAN-bus or Ethernet for example). Also, it should be appreciated that rather than using cabling, the control commands 54,56 may be transmitted wirelessly over a suitable wireless network, for example operating under WI Fi™ or ZigBee™ standards (IEEE802.11 and 802.15.4 respectively).

The objective of the central control module 52 is to implement a harmonious control strategy for the group of wind turbines 6 so that their interactions between each other, and the interactions between the wind turbines 6 and the support structure 4 are managed in the most effective way. Expressed another way, the central control module 52 applies a higher level control strategy to the operation of the wind turbine installation 2, whereas the local control modules 50 apply a lower level control strategy to each respective wind turbine 6 individually. However, both 'levels' of the control strategy operate together harmoniously in order to optimise the performance of the wind power installation 2, both in terms of absolute power production, production efficiency, and fatigue optimisation.

The central control module 52 may be configured to take action during potentially dangerous wind conditions, or during other relevant shutdown conditions, to set the wind turbines into a 'safe' state which reduces the stress caused on the wind turbines themselves and on the support arm arrangements 10 and the tower 4.

Figure 4:
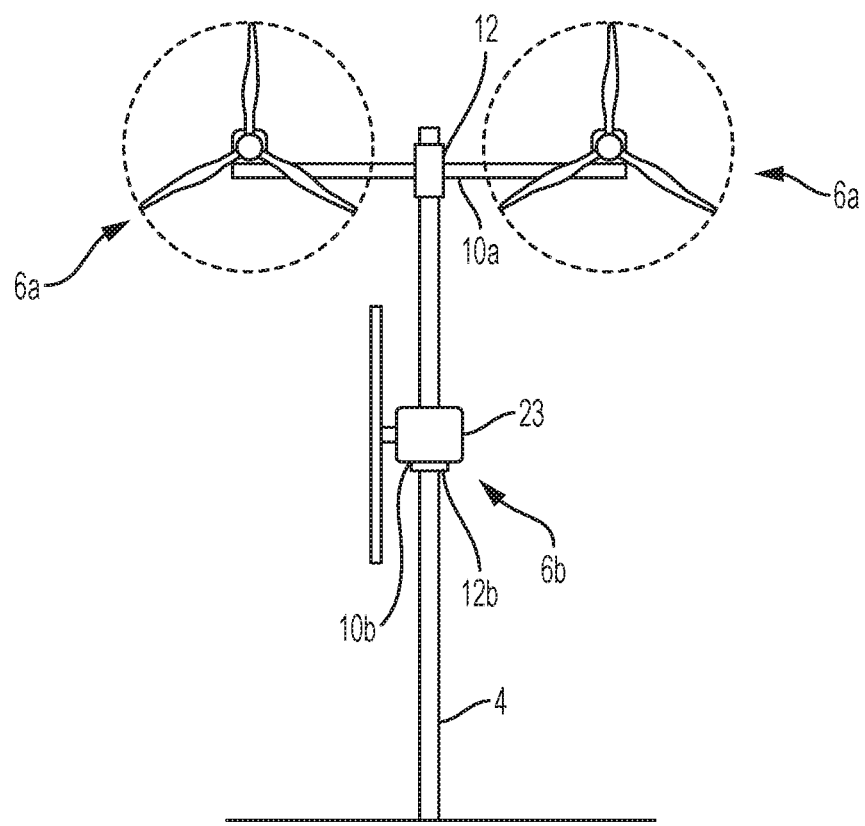
FIG. 4 is a front view of the wind turbine system in FIG. 1, but configured into a 'safe' state that is tolerant of high wind conditions.
Figures 5A, 5B:
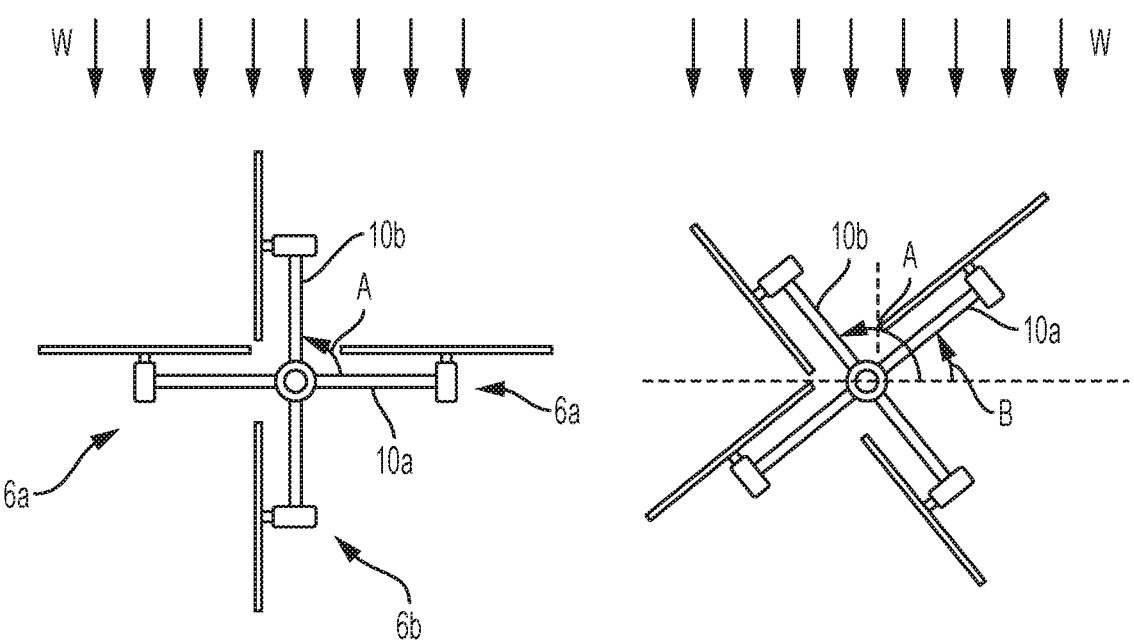
FIG. 5 is a top view of the wind turbine system in FIG. 4.

Embodiments of a safe state are illustrated in FIGS. 4 and 5*a*. As will be noted, in FIGS. 1 and 2, the wind turbine system in in an operational state and, as such, both the first and second support arm arrangements 10*a*, 10*b* are oriented transverse to the wind direction and so that the nacelles 23 and so also the rotors 22 are aligned with the wind direction, as shown by the series of arrows 'W' on FIG. 2. Expressed another way, the rotor discs 26 are substantially perpendicular to the wind direction. In this discussion, references to the wind turbine, the nacelle or the rotor 'facing into the wind' should be understood as meaning that the rotational axis of the rotor is aligned, i.e. is parallel, with the direction that the prevailing wind flow is moving.

When facing into the wind in this way, the wind turbines 6 are able to extract energy from the wind flow most efficiently. However, comparing this with FIGS. 4 and 5, it can be seen in these Figures that the second support arm arrangement 10*b* has been yawed about the tower 4 so that the wind turbines are no longer facing into the wind. More specifically, yaw unit 12*b* has an angular position such that the support arm arrangement 10*b* and therefore the rotor discs 26 are parallel to the wind direction. The second support arm arrangement 10*b* has therefore been moved angularly about the tower 4 so that the angular position of its yaw unit 12*b* has a difference of 90 degrees when compared to the angular position of the first yaw unit 12*a*, as indicated by arrow 'A'. In other words, the support arm arrangements are at right angles to one another. It should be noted that in this state the wind turbines are no longer operational since the control module 52 has taken appropriate action to shut down power generation.

A further embodiment of a safe state is shown in FIG. 5*b*. Here, it will be noted that the second support arm arrangement 10*b* has been rotated by 90 degrees with respect to the first support arm arrangement 10*a*. However, both the first support arm arrangement 10*a* and the second support arm arrangement 10*b* have been rotated by approximately 45 degrees relative to the oncoming wind. Therefore, the first support arm arrangement 10*a* defines an angular position of approximately 45 degrees relative to the wind direction, marked as arrow 'B', and the second support arm arrangement 10*b* defines an angular position of approximately 135 degrees with respect to the wind direction, marked again as arrow 'A', so that neither the first pair of wind turbines 6*a* nor the second pair of wind turbines 6*b* faces into the wind. Note, here that the central control module 52 has configured the wind turbine system into the safe state so that the 90 degrees difference in angular position between the first support arm arrangement 10*a* and the second support arm arrangement 10*b* is maintained. It will be appreciated in the above discussion that references to differences in yaw angles between the support arm arrangements are to be interpreted as being when the wind turbine system 2 is viewed from above, that is to say in plan view.

Beneficially, when the wind turbine system 2 is configured into the safe state and the wind turbines 6 are shut down, the rotor discs are set into positions that minimise the stress induced in the tower 4. In effect, the wind turbines 6*b* on the second support arm arrangement 10*b* provide excitations on the tower that at least partially counteract the excitations generated by the wind turbines 6*a* on the first support arm arrangement 10*a*. Since each of the wind turbines points in a different direction, the structure may be less sensitive to changes in the wind direction which reduces tower stresses and avoids the need for the structure to be yawed to follow wind direction changes.

Further embodiments of safe states are discussed in connection with FIG. 11.

Figure 6:
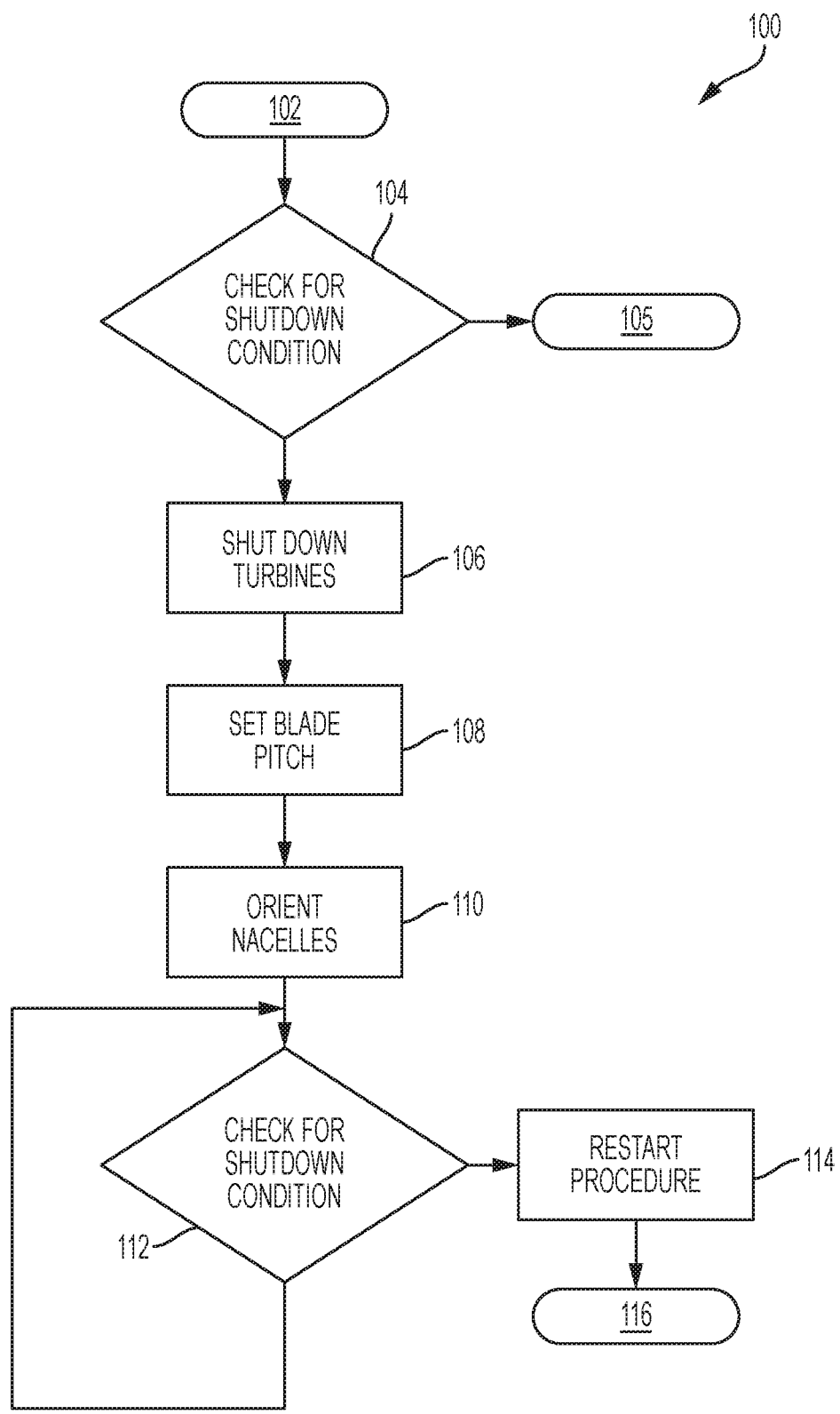
FIG. 6 is a flow chart illustrates a process that governs the configuration of the wind turbine system of FIG. 1 into the safe state as illustrated in FIGS. 4 and 5.

FIG. 6 is a flowchart of an embodiment of a process 100 that governs the configuration of the wind turbine system into the safe state. In this embodiment, the process 100 is implemented by the central control module 52. However, it should be appreciated that the process 100 could be implemented elsewhere, for example in a control system that forms part of a wind farm comprising many such multi-rotor wind turbine systems 2, or in one of the local control modules 50 acting as a 'master' device.

The process 100 initiates at step 102 which may be when the wind turbine system 2 has been started and before the wind turbine has reached a power generating state. Therefore, the process 100 may provide a level of safety to verify that the shutdown conditions are not present before running the wind turbine system up to an operational speed.

At step 104, the process 100 performs a check on the shutdown conditions. The shutdown conditions may be any condition that would affect the safe operation of the wind turbine. For example, grid failure may mean that a power supply isn't available to provide power to the electrical consumers of the wind turbine system 2, although a backup power supply would be able to provide temporary power for a short time period to those electrical consumers, for example pitch and yaw systems. Also, the wind turbine system 2 may detect that there is a fault with the power conversion system 31 which requires the system to be shutdown. Alternatively, the wind conditions may be such that it is not safe to continue operation of the wind turbine. In this case, wind conditions may be obtained by a wind sensor 55 mounted on the tower 4 for example. Alternatively, information about local wind conditions could be provided to the wind turbine system. Such a wind sensor is conventional and would be known to the skilled person as typically including a wind speed and direction sensor e.g. an ultrasonic device, or an anemometer and wind vane, although different devices are also known in the art, for example based on LIDAR sensors.

When monitoring wind conditions, the key is to identify when the wind conditions are considered to compromise the safe operation of the wind turbine. As such the shutdown condition check step 104 may be configured to monitor various parameters such as instantaneous wind speed and direction, average wind speed and direction, peak gust speed and so on, and to compare these parameters against suitable thresholds in order to arrive at a decision as to whether the prevailing wind conditions are safe or unsafe. The system could also be configured to monitor for predicted unsafe conditions, for example from advanced bad weather warnings from metrological services, from warnings from other turbines or wind farms, or from seismic sensing systems near to the wind turbine systems that incorporate weather sensing facilities, for example.

If the shutdown conditions are determined to be safe, then the process 100 terminates at step 105 so that the operation of the wind turbine system 2 is unaffected.

However, if the shutdown conditions are determined to be present the process 100 proceeds to step 106 at which the central control module 52 commands all of the wind turbines 6 to initiate a shutdown sequence in which power generation is terminated and the rotors are brought to either to a stop or to an idle condition. It is envisaged that an idle condition may be preferable since this would not require the application of a mechanical brake, which may apply high gear loads.

Once the shutdown sequence has been initiated at step 106, the central control module 52 commands the wind turbines to set the pitch of the blades into a non power producing position at step 108. For example, the pitch of the blades may be set to a parked or 'feathered' position. As the skilled person will know, wind turbine blades are typically configured so that their pitch may be changed during operation in order to increase or decrease the thrust generated by the blade on the rotor. Typically, blade pitch can be varied from a predetermined 'negative' pitch angle range that are used to provide stall settings for the blade, through a zero pitch position in which the blade chord is substantially coincident with the plane of rotation of the rotor disc 26, and up to a predetermined positive pitch angle which may be equal to or greater than 90 degrees. It is the positive pitch angle settings that are used to vary the thrust produced by the blade on the rotor. A pitch angle of 90 degrees, where the chord of the blade is substantially perpendicular to the plane of rotation of the blade, is usually considered to be a park or feathered position of the blade since at this angle the blade should not produce thrust on the rotor.

Although the blade pitch setting step 108 is shown as separate to step 106 in FIG. 6, it should be appreciated that the functionality of setting the blades to a feathered position may be combined into the wind turbine shut down sequence in step 106.

Once the wind turbines have been shut down and the pitch of the blades have been regulated so that the rotors are no longer producing power, the central control module 52 commands the yaw units 12a,12b of the support arm arrangements 10a,10b to the safe state at step 110. So, with reference to FIG. 5a, the central control module 52 commands the second yaw unit 12b to move angularly in the anti-clockwise direction so that its yaw angle differs from the yaw angle of the first support arm arrangement 10a by 90 degrees. Alternatively, and with reference to FIG. 5b, the central control module 52 commands the yaw unit 12b of the second support arm arrangement 10b to move anticlockwise by 135 degrees and the yaw unit 12a of the first support arm arrangement 12a to move anticlockwise by 45 degrees.

Once the wind turbines have been oriented into the safe state at step 110, a second shutdown condition check is performed at step 112, as was performed at step 102. Here the central control module 52 checks to see if the shutdown conditions are still considered to be present, or whether the shutdown conditions have been resolved such that it is safe to restart the wind turbines for power production. This check is repeated for as long as the shutdown conditions are determined to be present. However, once the shutdown conditions are determined as being not present, the central control module 52 implements a wind turbine restart procedure at step 114 at which the yaw units 12a,12b are commanded back to their start position in which the wind turbines face into the prevailing wind direction. The process 100 then terminates at step 116.

The above description explains how the central control module is operable to ensure that the first and second support arm arrangements 10a,10b are configured into a safe state when a relevant shutdown condition is detected. In the above example, the first and second support arm arrangements 10a,10b are configured so that their yaw angles differ by approximately 90 degrees. However as discussed in connection FIG. 11 embodiments exist where 90 degrees are chosen as a minimum angle between the arm arrangements.

It is to be expected that some angular misalignment between the first and second support arm arrangements is to be expected, and tolerated. Currently it is envisaged that an angle error in the region of 10 degrees would be acceptable.

The process 100 that has been described above is intended to be repeated continuously so that the shutdown conditions are monitored closely. Therefore, appropriate action can be taken promptly in the event that a relevant shutdown condition occurs.

The skilled person will appreciated that modifications may be made to the specific embodiments described above without departing from the inventive concept as defined by the claims.

For example, in an alternative embodiment it is envisaged that rather than setting the pitch of the blades to the feathered position during the turbine shutdown process at step 106 and 108, the pitch of the blades on the wind turbines 6 may be controlled to produce differential thrust on a respective support arm arrangement 10a,10b thereby assisting the yawing movement. So, instead of powering the yaw units 12a,12b to move their respective support arm arrangements, the blade pitch on each of the rotors is regulated to control the thrust generated by the rotors, thereby controlling the angular movement of the support arm arrangements.

Also, although in the above embodiments, the support structure has been described as comprising a tower in the form of a relative slender steel or concrete tubular structure, it will be appreciated that other tower structures are known, albeit are less common, for example towers in the form of trellis or frame-like structures, or even being formed by parts of buildings.

Figure 7:
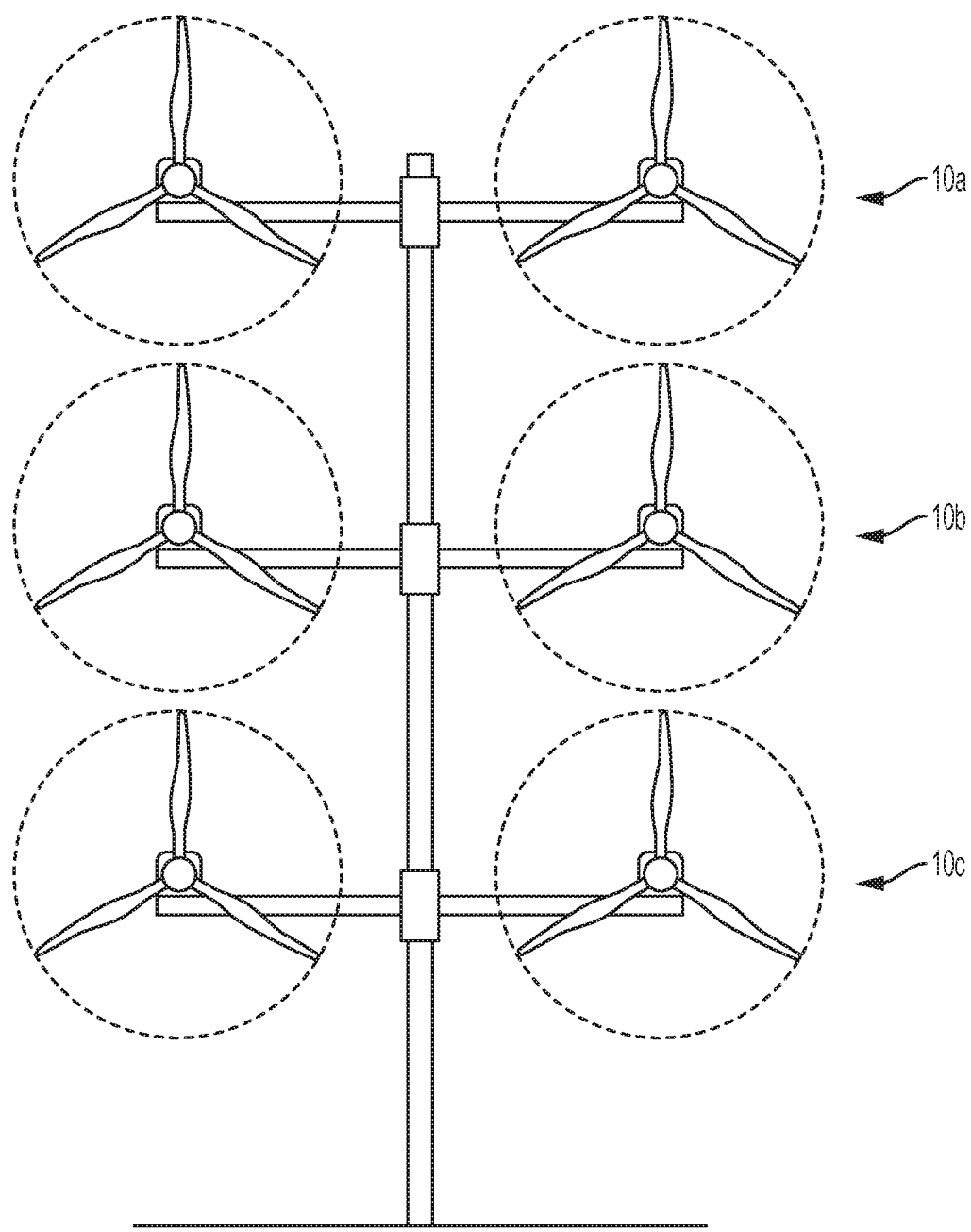
FIG. 7 is a front view of an alternative embodiment of a wind turbine system.

In the above embodiments, the wind turbine system 2 comprises four wind turbines that are groups into two pairs, each of the wind turbine pairs being coupled to a respective one of the support arm arrangements 10a,10b. However, the invention extends to other embodiments with more than two support arm arrangements. For example, with reference to FIGS. 7 and 8, an alternative wind turbine system 2 resembles closely the embodiment of FIG. 1 but includes a third support arm arrangement 10c which carries a respective third pair of wind turbines 6c.

Apart from the third support arm arrangement 10c, the rest of the wind turbine system 2 is the same as for the previous embodiments and so will not be described again here for brevity.

Figure 8:
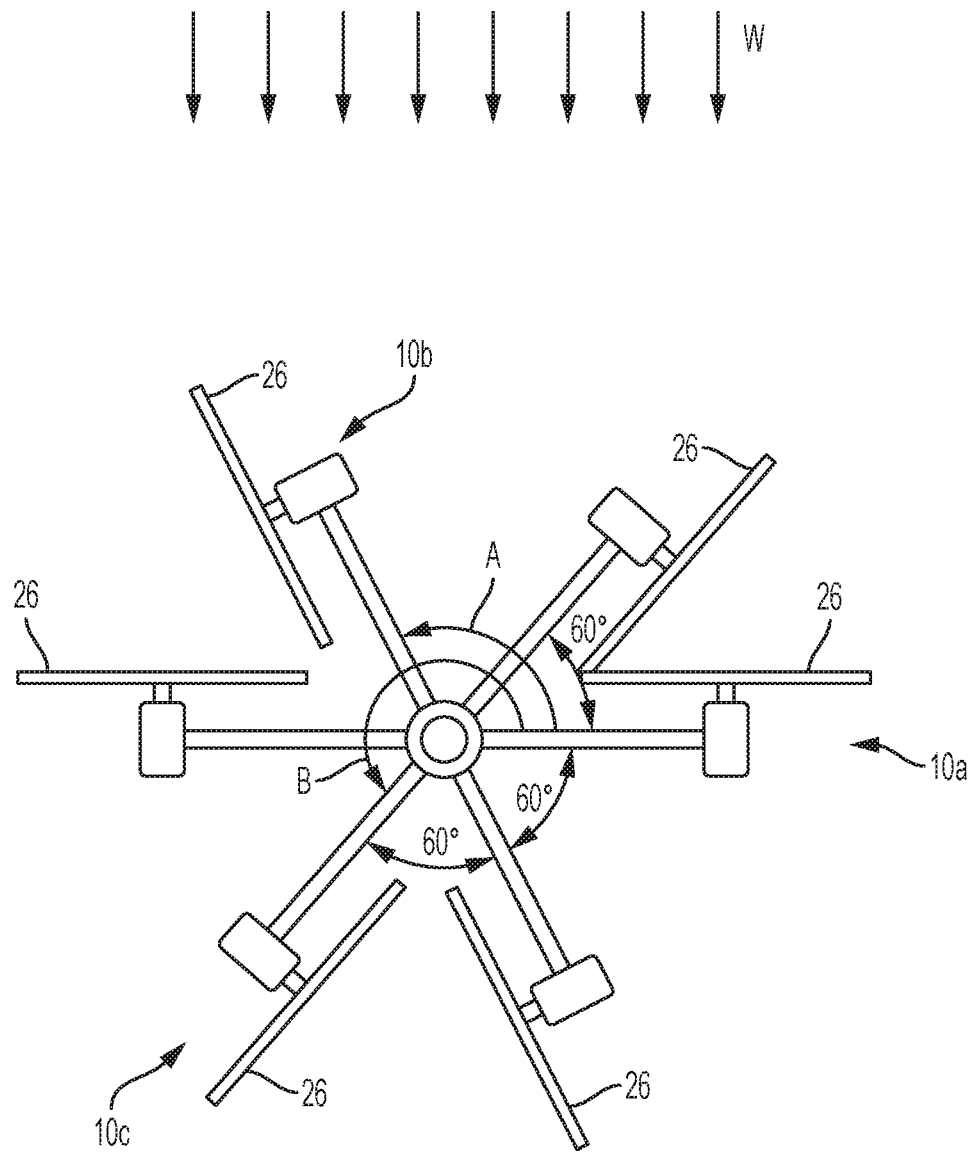
FIG. 8 is a top view of the wind turbine system of FIG. 7, but illustrated in a safe state that is tolerant of high wind conditions.

FIG. 8 shows the wind turbine system 2 configured into its safe state. For this discussion, the first support arm arrangement 10a, which the located uppermost on the tower 4, is considered to be a 'reference' support arm arrangement against which the yaw position of the second and third support arm arrangements 10b,10c are compared. The reference support arm arrangement 10a is the only one that faces the oncoming wind W when in the safe state.

So, the second support arm arrangement 10b has been yawed in the anticlockwise direction by 120 degrees compared to the initial position, as indicated by arrow 'A'. Furthermore, the third support arm arrangement 10c has been yawed in the anticlockwise direction by 240 degrees as indicated by arrow '13' (or alternatively yawed in the clockwise direction by 120 degrees) compared to the initial position. In effect therefore, the configuration shown in FIG. 8 provides an even spread of orientation for the wind turbines to reduce the generation of stress that the wind turbines cause to the tower during shutdown conditions. Note that in this safe configuration, there is angular interval of approximately 60 degrees between each support arm of the support arm arrangements 10a,10b,10c. In the same way as in FIG. 5b, the angular position of the all of the support arm arrangements 10a,10b,10c may be configured such that none of the rotor discs 26 of the wind turbines face into the wind, although the angular separation between the individual support arms is kept the same.

Reference will now be made to FIGS. 9, 10a and 10b which illustrate a further alternative embodiment of the invention. From the front view of the wind turbine system 2 of this embodiment, it will be appreciate that the wind turbine system 2 is similar to the wind turbine system of FIG. 1. However, in this embodiment, each rotor 22 comprises two blades 24 instead of a three-bladed configuration of previous embodiments. In all other respects, the structure of the wind turbine system 2 is the same as in previous embodiments.

FIG. 9 and FIG. 10a show the wind turbine system 2 in an operational state in which the support arm arrangements 10a,10b, and therefore the nacelles 23a,23b are oriented so that the rotor discs 26a,26b are perpendicular to, and therefore face into, the wind direction W. Expressed another way, the nacelles 23a,23b are aligned with the wind.

FIG. 10b illustrates how the wind turbine system may be configured into a safe state. Here should be noted that both the first and second support arm arrangements 10a,10b have been yawed in a clockwise direction about the tower 4 which has the effect of orienting the rotor discs 26a,26b, and also the support arm arrangements 10a,10b so that they are parallel with the wind direction W. In the embodiment of FIG. 10b, the support arm arrangements 10a,10b have been yawed approximately 90 degrees in the clockwise direction, as indicated by the arrow A, so the yaw angle of both of the support arm arrangements 10a,10b is substantially the same.

In addition, the rotor 22 is configured so that the blades 24 are also aligned with the wind, that is to say that the blades 24 are substantially horizontal to the ground or foundation 8, and are locked in this position. Also, although not shown here the pitch angle of the blades 24 are set to be in a feathered position. The effect of this is that the orientation of the blades 24 presents the smallest possible profile to the oncoming wind which means that the wind exerts less force on the structure of the wind turbine system via the blades 24.

Note that in circumstances where it is desirable to yaw either one of the support arm arrangements, it would be possible to move the blades out of the featured position in order to generate thrust on the support arm arrangements thereby providing a yaw function.

Figure 11:
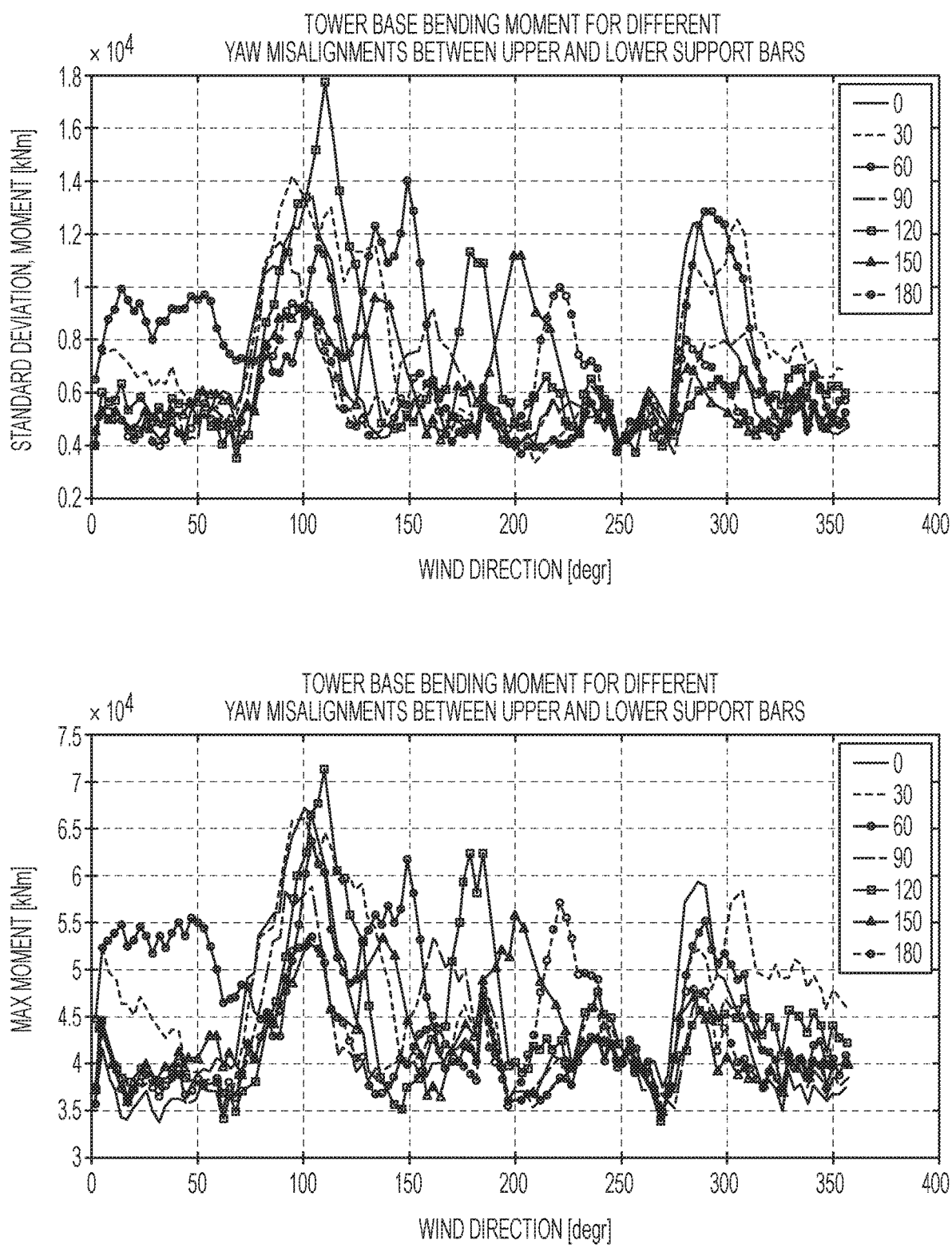
FIG. 11 illustrates aeroelastic load simulations of a wind turbine model of the type schematically illustrated in FIG. 1.

FIG. 11 illustrates aeroelastic load simulations of a wind turbine model of the type schematically illustrated in FIG. 1. The simulations have been made at a relatively high wind speed of 37.5 m/s (10 min average).

The figure illustrates standard deviation and max value of the bottom tower bending moment measured in kNm. The simulations have been made for 10 second time series and the bending moment values have then been calculated for each of these time series. In the simulations the wind direction is set to change slowly from 0 to 360 degrees (over 20 minutes) and the different curves show simulations with 0, 30, . . . , 180 degrees misalignment between upper and lower support arm arrangements. The yaw system is locked for each series.

In the figures the degrees along the horizontal axis indicate the angle of the lower arm relative to the wind direction. The upper arm is fixed. However, the simulations also apply for a swapped situation.

As can be seen on the graphs, the difference in yaw angle of the first and second support arm arrangements can beneficially be selected to be greater than 90 degrees since, in particular in the 30-90 degree interval, the standard deviation and extreme moment for some wind directions are high. Minimum load is observed for a misalignment of at least 150 degrees, and 180 degrees is found to be a good position. Thus in an embodiment, the difference in yaw angle of the first and second support arm arrangements is between 150 and 210 degrees, and may advantageously be selected as 180 degrees.

Moreover, in the range of wind directions between 240 to 270 degrees, the standard deviation is low regardless of the yaw misalignment between bars (all curves are bundled together and the values are low). This shows that an angular orientation of one of the arms 240-270 degrees out of the wind then the risk for instability is smallest, irrespectively of the misalignment between arms. In an embodiment the control system may be configured to set the yaw angle of the at least the first support arm (or any other support arm) to a value between 240 to 270 degrees with respect to the direction of the wind.

In an embodiment, based on the simulations, a misalignment of 180 degrees is a good position. It can be expected that the turbine actually will turn into backwind position if not locked. This may be utilized by providing a failsafe lock on only one of the support bars while letting the other one yaw freely. In such configuration it is expected that the support arms automatically end up in a 180 degree misalignment position at high wind, also in case the grid is lost and active yawing cannot be used. If a yaw lock is needed during service, the service technicians can bring a mechanical lock for the support bar which does not have one. Thus in an embodiment, the control system is operable to lock the first yaw unit at a given angle and let the second yaw unit yaw freely.

The invention claimed is:

1. A wind turbine system comprising a first pair of wind turbines mounted to a support structure by a first support arm arrangement, and a second pair of wind turbines mounted to the support structure by a second support arm arrangement;
wherein the first and second support arm arrangements are mounted to the support structure at a respective yaw unit so as to yaw about a major axis of the support structure;
further including a control system that is configured to control a yaw angle of each of the first and second support arm arrangements, wherein the control system is configured to identify a presence of a predetermined shutdown condition and, in response, the control system configures the yaw angles of the first support arm arrangement and the second support arm arrangement to a predetermined safe state,
wherein when in the predetermined safe state the first support arm arrangement is nonparallel to a wind direction.

2. The wind turbine system of claim 1, wherein when in the predetermined safe state, the yaw angle of the first support arm arrangement is configured to be substantially the same as the yaw angle of the second support arm arrangement such that the first and second support arm arrangements are both nonparallel to a wind direction.

3. The wind turbine system of claim 1, wherein the control system is operable to configure the yaw angles of the first support arm arrangement and the second support arm arrangement to a predetermined safe state in which the yaw angle of the first support arm arrangement is different than the yaw angle of the second support arm arrangement.

4. The wind turbine system of claim 3, wherein a difference in yaw angles of the first and second support arm arrangements is at least 90 degrees.

5. The wind turbine system of claim 4, wherein the difference in yaw angles of the first and second support arm arrangements is between 150 and 210 degrees.

6. The wind turbine system of claim 3, wherein the control system is configured to set the yaw angles of the first and second support arm arrangements to a value so that neither the first pair of wind turbines or the second pair of wind turbines faces the wind direction.

7. The wind turbine system of claim 6, wherein the control system is configured to set the yaw angle of at least the first support arm arrangement to a value between 240 to 270 degrees with respect to the wind direction.

8. The wind turbine system of claim 1, including a third pair of wind turbines mounted to a third support arm arrangement, wherein the third support arm arrangement is mounted to the support structure by a yaw unit.

9. The wind turbine system of claim 8, wherein the control system is configured to set a yaw angle of the third support arm arrangement to a value that is different than the yaw angle of the first and second support arm arrangement.

10. The wind turbine system of claim 3, wherein the control system is operable to yaw the first support arm arrangement and the second support arm arrangement about the support structure at the same time, whilst maintaining the same yaw angle difference between them.

11. The wind turbine system of claim 1, wherein in controlling the yaw angles of the first and second support arm arrangements, the control system is operable to control a respective yaw unit of each of the first and second support arm arrangements.

12. The wind turbine system of claim 1, wherein in controlling the yaw angles of the first and second support arm arrangements, the control system is operable to lock a first yaw unit at a given angle and let a second yaw unit yaw freely.

13. The wind turbine system of claim 1, wherein in controlling the yaw angles of the first and second support arm arrangements, the control system is operable to control the differential blade pitch angles of the wind turbines so that a differential thrust is produced between each pair of wind turbines mounted on a respective one of the first and second support arm arrangements.

14. A method of controlling a wind turbine system having a first pair of wind turbines mounted to a support structure by a first support arm arrangement, and a second pair of wind turbines mounted to the support structure by a second support arm arrangement, wherein the first and second support arm arrangements are mounted to the support structure at a respective yaw unit so as to yaw about a major axis of the support structure; wherein the method comprises identifying the presence of a predetermined shutdown condition and, in response thereof, controlling a yaw angle of each of the first support arm arrangement and the second support arm arrangement to a predetermined safe state, wherein in the predetermined safe state at least one support arm arrangement is non-parallel to the wind direction.

* * * * *